Figures 1, 2:
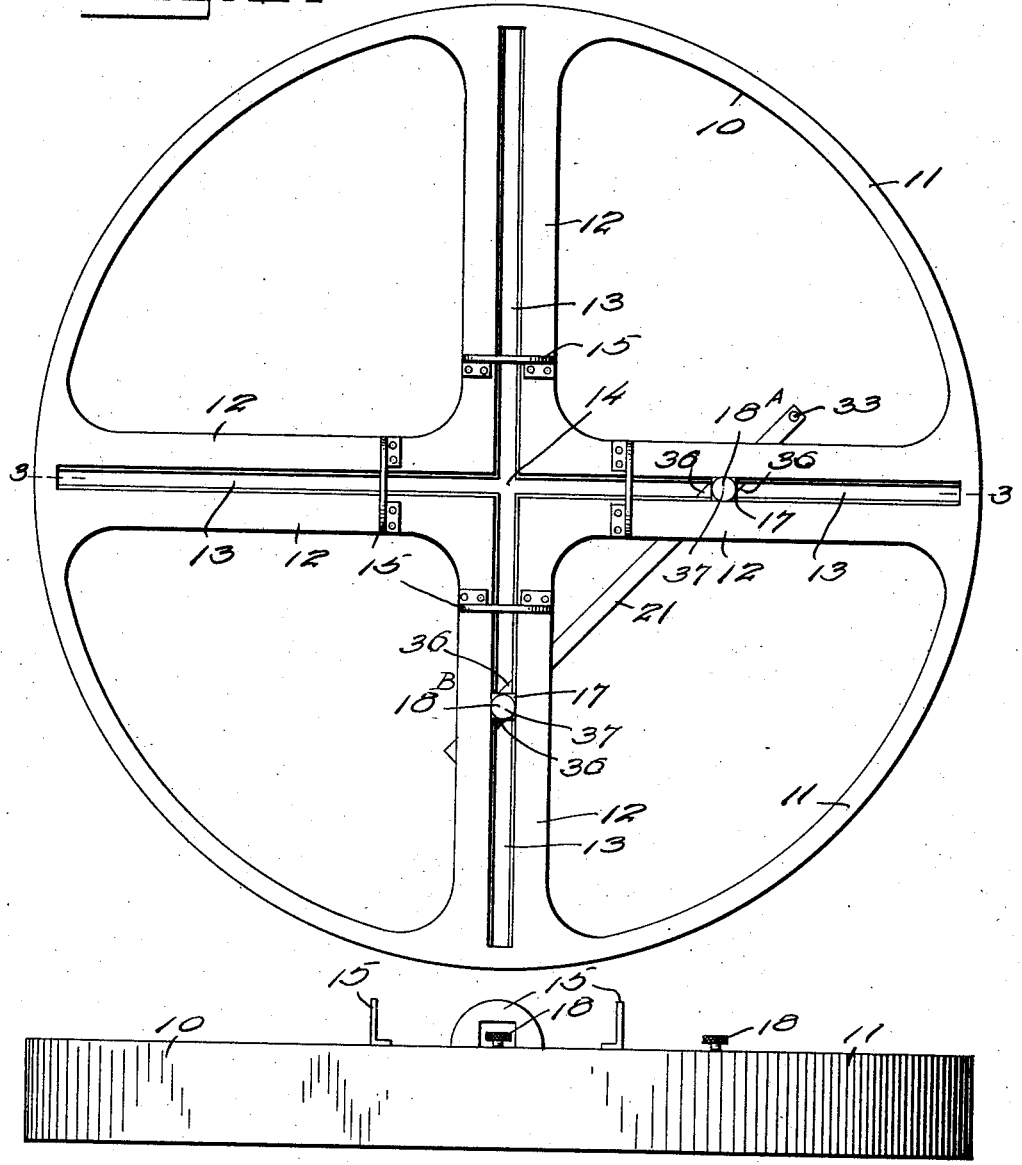

B. A. BALL.
ELLIPSOGRAPH.
APPLICATION FILED OCT. 17, 1911.

1,048,126.

Patented Dec. 24, 1912.

2 SHEETS—SHEET 1.

Witnesses
R. L. Armstrong
Harry M. Test

Inventor
B. A. Ball,
By Harry Ellis Chandlee
Attorney

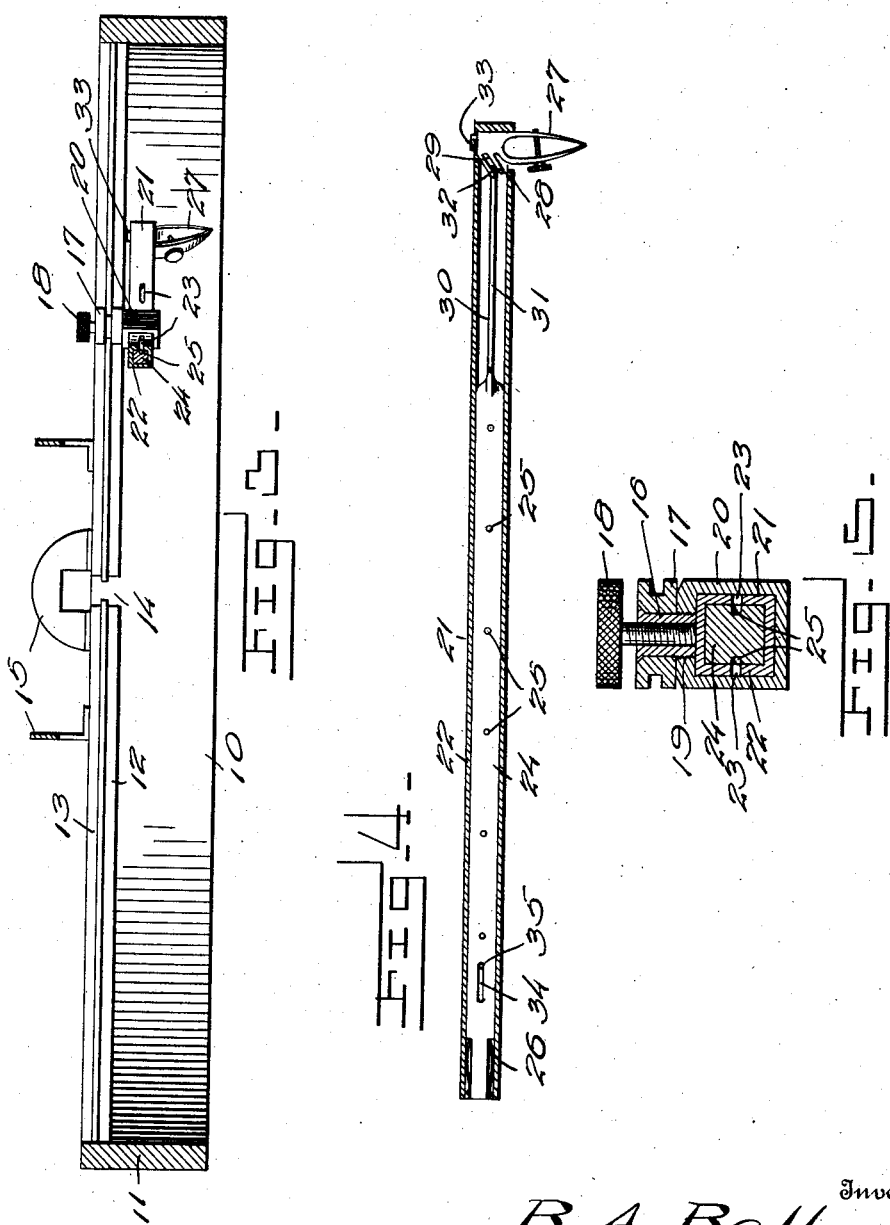

UNITED STATES PATENT OFFICE.

BIRTLEY A. BALL, OF MOLALLA, OREGON.

ELLIPSOGRAPH.

1,048,126.  Specification of Letters Patent.  Patented Dec. 24, 1912.

Application filed October 17, 1911. Serial No. 655,098.

*To all whom it may concern:*

Be it known that I, BIRTLEY A. BALL, a citizen of the United States, residing at Molalla, in the county of Clackamas and State of Oregon, have invented certain new and useful Improvements in Ellipsographs, of which the following is a specification.

This invention relates to improvements in drawing instruments and has particular reference to devices for drawing ellipses, ovals or other irregular curves.

The principal object of the invention is to provide an ellipsograph with means for raising and lowering the scriber point.

Other objects and advantages will be apparent from the following description and with particular reference to the accompanying drawings.

In the drawings: Figure 1 is a top plan view of an ellipsograph made in accordance with my invention. Fig. 2 is a side elevation. Fig. 3 is a section on the line 3—3 of Fig. 1. Fig. 4 is an enlarged sectional detail of the scriber arm. Fig. 5 is a cross sectional view of the scriber arm, guide and hollow block.

Referring to the drawings 10 represents the frame of the ellipsograph which comprises the annulus 11 and the radial connection arms 12. The arms 12 are provided with the slots 13 which intersect centrally of the frame as at 14. Arch-shaped braces 15 are secured to the arms 12 across the slots to hold the inner ends of the arms in proper position so that the slots at the inner ends will remain in perfect alinement, said arches being of sufficient height to permit the thumb screws 18 to pass thereunder. There are two of these screws 18 which are arranged respectively in the slots of adjacent arms. These screws 18 are threaded into cylindrical bushings 16. The upper portions of these bushings form bearings for the square blocks 17 the slots of which receive the slides on the opposite sides of the slots of the arms 12, said bushings being provided with longitudinally threaded passages to receive a clamping screw 18 each of which has a depression 18' in its head for a purpose to be later referred to. The lower portion of the bushings 16 engages in a threaded opening 19 in a hollow block 20 which supports the scriber arm 21 to be later referred to. The scriber arm 21 comprises an outer tubular portion 22 which is provided with a series of longitudinally arranged elongated slots 23 said member 22 being supported in the blocks 20. Arranged within the member 22 is a smaller bar 24 having formed therein the openings 25 whereby when a pointed instrument is inserted through one of the slots 23 and engaged with one of the openings 25 the bar 24 can be moved backward or forward. In one end of the bar 24 are attached friction springs 26 so that the bar 24 will be held frictionally in its inner or outer adjusted position.

Secured to one end of the bar 22 is a scriber point 27 which may be either a pen as represented in the drawings, or a pencil, and adapted to slide vertically in said bar. On the inner side of the scriber point is a downwardly inclined enlargement 28 having a downwardly inclined open-ended slot 29 in which is engaged a reduced end 30 of the bar 24, said reduced end having a slot 31 and a transversely connecting portion 32 which portion engages in the slot 29. When the sharp instrument is inserted in one of the slots 23 and engaged with one of the openings 25 and moved in the direction of the scriber point the bar 24 will be moved therewith and cause the portion 32 to ride on the incline in the enlargement 28 thus driving the point downwardly into engagement with the drawing surface. A reverse movement of the sharpened instrument will lift the scriber point from the drawing surface. Extending vertically through the upper portion of the scriber point is the opening 33 through which ink is adapted to be poured to flow to the lower end of the point.

In the bar 24, near one end is a transversely arranged pin 34, which plays in the slots 35 formed in opposite sides of the tubular member 22, whereby the bar is limited in its longitudinal movements in the tubular member.

In the use of the device the screws 18 are both loosened and the blocks 17 positioned as in Fig. 1. A pair of ordinary dividers are then set to one-half the minor axis of the ellipse to be drawn, and one point set in a depression 33' in the head of the scriber 27. The bar 21 is then moved until the other point of the dividers will be centered in the depression 37. Thus the minor axis is obtained. To obtain the major axis the same operation is proceeded with, except that one point of the dividers is placed in the other depression 37', it, of course, being understood that the dividers are set to one-half the major axis of the ellipse to be drawn.

What is claimed is:—

1. The combination with an ellipsograph frame, having slots intersecting at right angles, of slidable members in the slots, a scriber arm adjustably mounted in the slidable members, a scriber point reciprocably mounted in one end of the arm, and means longitudinally slidable in the arm and engaging the scriber point for moving the point upwardly and downwardly.

2. The combination with an ellipsograph frame, of a tubular scriber arm having a series of elongated slots, a scriber point vertically slidable on one end of the arm, a slotted extension on the scriber point, a bar longitudinally slidable in the tubular arm and provided with a series of openings registering with the said slots, and means on one end of said arm for engagement in the slot of the scriber point whereby when said bar is moved longitudinally the scriber point will be reciprocated.

In testimony whereof I affix my signature, in the presence of two witnesses.

BIRTLEY A. BALL.

Witnesses:
E. R. TODD,
J. H. VERNON.

Copies of this patent may be obtained for five cents each, by addressing the "Commissioner of Patents, Washington, D. C."